US007770824B2

(12) United States Patent
Frasch et al.

(10) Patent No.: US 7,770,824 B2
(45) Date of Patent: Aug. 10, 2010

(54) ORIENTATION OF ELECTRICAL BRIDGES IN INJECTORS

(75) Inventors: Juergen Frasch, Holzgerlingen (DE); Christoph Butscher, Leonberg (DE); Michael Fleig, Gerlingen (DE); Stephan Wehr, Heiligenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 466 days.

(21) Appl. No.: 11/722,531

(22) PCT Filed: Dec. 14, 2005

(86) PCT No.: PCT/EP2005/056788

§ 371 (c)(1),
(2), (4) Date: Jun. 22, 2007

(87) PCT Pub. No.: WO2006/081895

PCT Pub. Date: Aug. 10, 2006

(65) Prior Publication Data

US 2008/0110442 A1 May 15, 2008

(30) Foreign Application Priority Data

Jan. 31, 2005 (DE) ...................... 10 2005 004 320

(51) Int. Cl.
*F02M 51/06* (2006.01)
*F02M 51/00* (2006.01)
*F02M 61/04* (2006.01)
*F02M 61/00* (2006.01)
*F16K 31/02* (2006.01)

(52) U.S. Cl. ................ 239/585.1; 239/533.2; 123/472; 251/129.01

(58) Field of Classification Search ............. 239/533.2, 239/533.3, 585.1–585.5, 900; 123/472; 251/129.01, 251/129.09, 129.1, 129.15; 439/655
See application file for complete search history.

(56) References Cited

U.S. PATENT DOCUMENTS

| | | | | |
|---|---|---|---|---|
| 6,027,049 | A | 2/2000 | Stier | |
| 2003/0168532 | A1 | 9/2003 | Maier | |
| 2003/0224664 | A1 * | 12/2003 | Brock et al. | 439/638 |

FOREIGN PATENT DOCUMENTS

| | | | |
|---|---|---|---|
| DE | 100 39 218 | A1 | 2/2002 |

* cited by examiner

*Primary Examiner*—Darren W Gorman
(74) *Attorney, Agent, or Firm*—Ronald E. Greigg

(57) ABSTRACT

A fuel injector is disclosed in which at least one electrically-controlled valve is arranged within an injector body and is connected to an injector body contact which is accessible from outside the injector body by at least one solid conductor having an essentially stable form under the influence of its intrinsic weight. The at least one solid conductor is run through at least one conductor channel and at least one alignment sleeve which may be completely or partly inserted in the at least one conductor channel and forces the at least one solid conductor completely or partly to adopt a given inclination to the injector axis and hence aligns the same.

9 Claims, 11 Drawing Sheets

Fig. 4
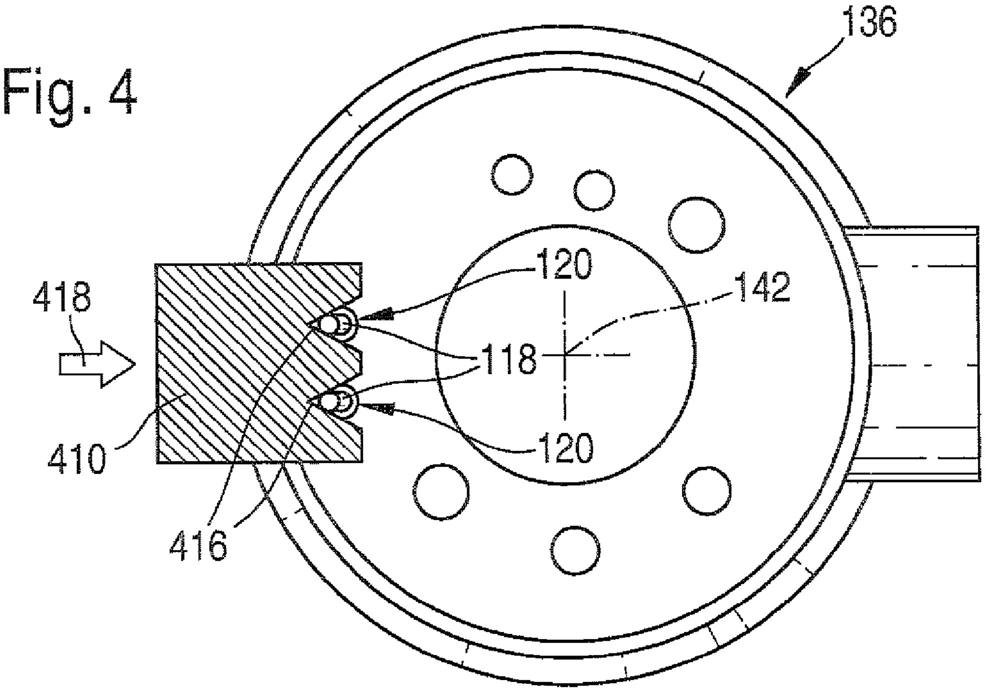
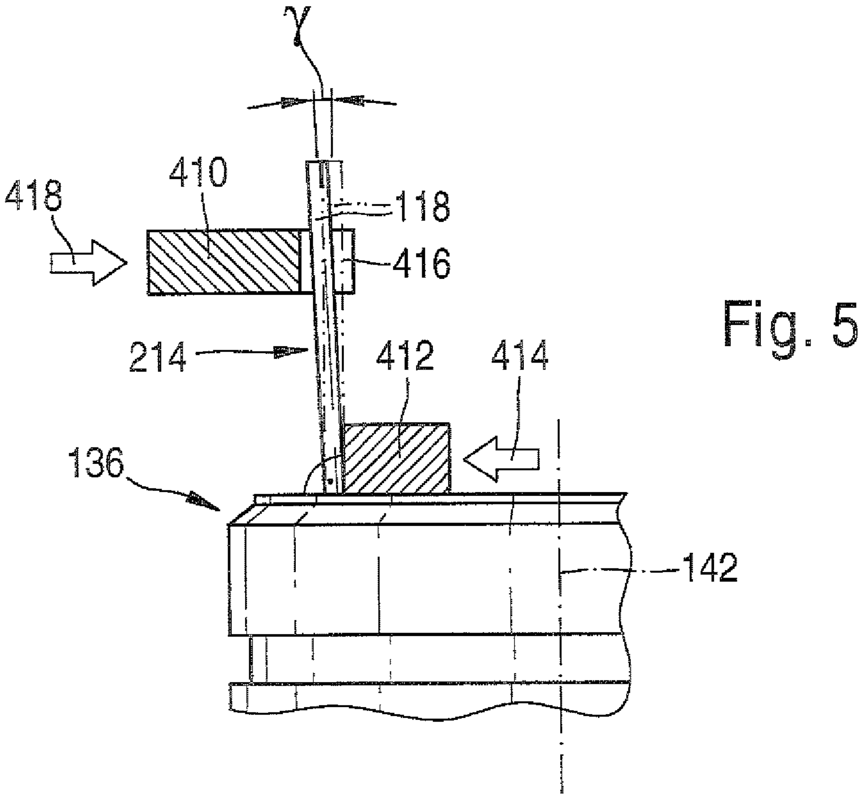
Fig. 5

ORIENTATION OF ELECTRICAL BRIDGES IN INJECTORS

CROSS-REFERENCE TO RELATED APPLICATION

This application is a 35 USC 371 application of PCT/EP 2005/056788 filed on Dec. 14, 2005.

BACKGROUND OF THE INVENTION

1. Field of the Invention

In fuel injection systems for direct-injection internal combustion engines, fuel injectors that contain one or more electrically triggerable valves are employed. For instance, an electrically triggerable magnet valve or piezoelectric valve may be provided for controlling a needle valve and thus for controlling the course of injection. Further valves may be used, for instance for a pressure boost. The electrical contacting of these valves, however, is often a challenge.

2. Prior Art

Since the electrically triggerable valve or valves are typically accommodated in the interior of an injector body, the electrical contacting of these electrically triggerable valves presents considerable technical difficulties. In many cases, on top of the injector body there is an electrical contact that can be connected to a corresponding control system and power supply system located outside the injector body. Via this contact (which may be either a multiple plug, or a plurality of individual plugs), all the electrically triggerable valves received in the interior of the injector body are as a rule triggered. In the interior of the injector body, this electrical contact must be connected to corresponding contacts of the electrically triggerable valve or valves of the injection system. This connection is typically done by means of flexible electrical cables and a simple soldering process.

This method for electrically contacting the electrically triggerable valves is associated with various disadvantages, however. For instance, the method is technically quite labor-intensive, since typically the cables must be initially soldered by hand against the corresponding electrical contacts. In practice, this method step requires great effort and is very time-consuming. Moreover, the connection between the electrically triggerable valves and the electrical contact on the injector body can be undone again only with difficulty. For removing or disassembling the injector body, the soldered connections must typically be unsoldered again. Such a labor-intensive process makes it uneconomical to repair the injectors or replace individual parts of the injector body.

SUMMARY OF THE INVENTION

According to the invention, a fuel injector for injecting fuel into a combustion chamber of an internal combustion engine and an orientation sleeve for use in a fuel injector of the invention and a method for producing a fuel injector of the invention are proposed, in which the above-described disadvantages of the prior art are avoided or reduced. The fuel injector has an injector body contact with an injector axis, at least one electrically triggerable valve let into the injector body, and at least one electrical injector body contact that is accessible from outside the injector body. At least one of the electrically triggerable valves should have at least one electrical valve body contact.

A fundamental concept of the present invention is to use a solid conductor for the electrical connection between the at least one valve contact and the at least one injector body contact, which solid conductor, in contrast to a simple cable or wire, does not become deformed under its own weight and is contactable via plug contacts, for instance, instead of a soldered connection. Slight plastic deformation of the solid conductor under its own weight and under additional exertion of force can be tolerated, if the design of the solid conductor remains substantially unchanged. The at least one solid conductor thus represents a kind of artificial lengthening of the electrical valve contacts.

However, the problem then is that the solid conductor when the fuel injector is put together must usually be guided through one or more conductor conduits, which in various regions or modules of the fuel injector can have different angles of inclination to the injector axis. Thus a solid conductor is extended out of a module at a first angle, for instance, and then on being guided into a conductor conduit of a second module, which has a different angle of inclination to the injector axis from the first angle of inclination, must be adapted to that first angle of inclination. This makes assembling the individual modules of the fuel injector more difficult. The angle adaptation can also lead to problems, particularly when the solid conductor is inserted into a plug contact that has only a slight angular tolerance. The fundamental concept of the invention to solve these problems of angle adaptation is to use at least one orientation sleeve. By means of this orientation sleeve, a predetermined inclination, such as 0L176\f"Symbol"\s12, to the injector axis is forced on the at least one solid conductor in at least one module, either entirely or in part. For instance, a solid conductor on being extended out of a conductor conduit of a module can be compelled to have the angle of inclination of the conductor conduit in an adjacent module or further module into which the solid conductor is then introduced.

BRIEF DESCRIPTION OF THE DRAWINGS

The invention is described in further detail below in conjunction with the drawings.

Shown are:

FIG. 4, a top view of an angle adaptation of two solid conductors by means of a prism;

FIG. 5, a side view of an orientation of a solid conductor by means of a stop and a prism;

DESCRIPTION OF THE PREFERRED EMBODIMENTS

Figure 1:
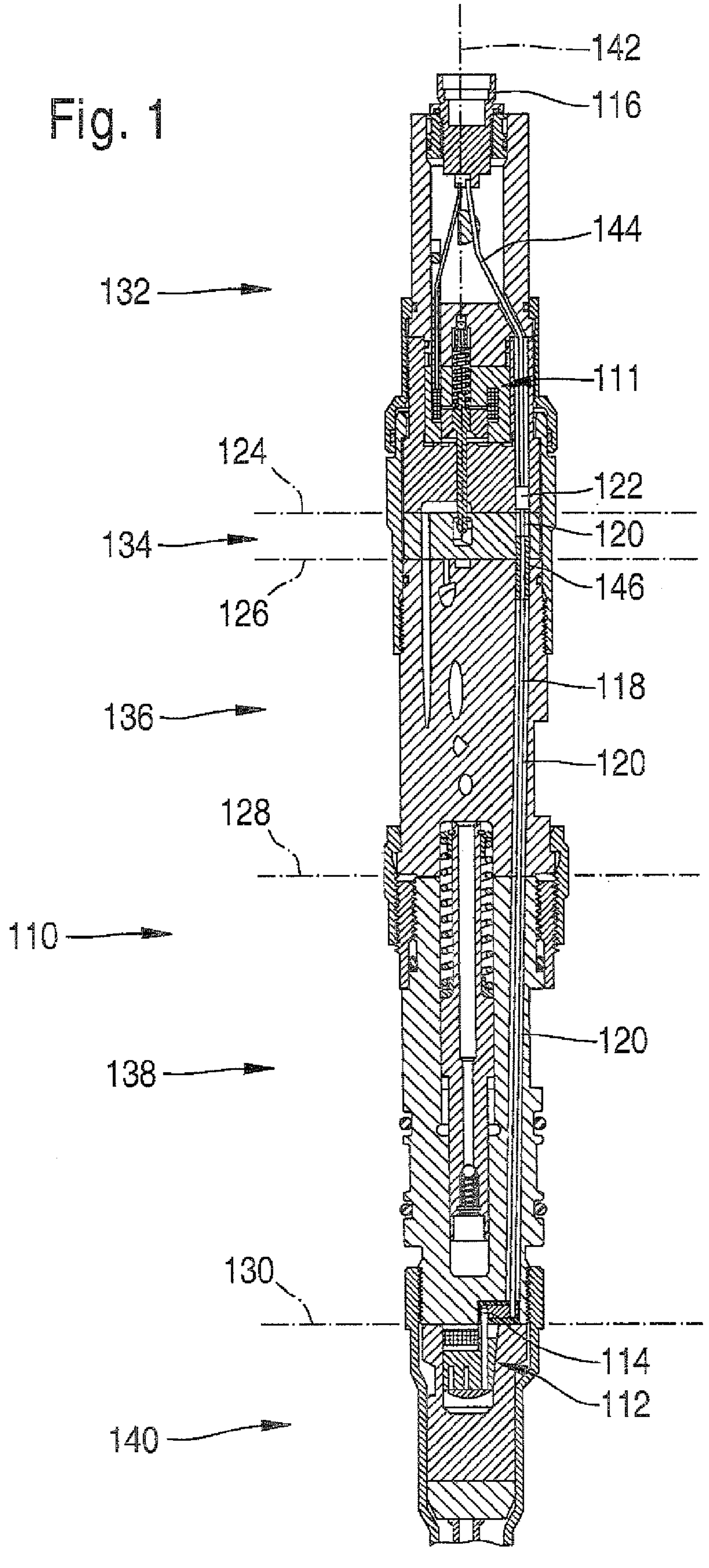
FIG. 1, a sectional view of a fuel injector having a magnet valve for nozzle needle control and a solid conductor for electrical connection of the magnet valve to an external injector body contact.

In FIG. 1, an overall view of an injector body 110 for a common rail injection system is shown. The injector body 110 can be disassembled at the parting lines 124, 126, 128 and 130 into essentially five function modules, namely one control module 132, one sealing plate 134, one line connection module 136, one pressure booster module 138, and one nozzle module 140. The pressure booster module 138 serves essentially to boost a fuel pressure (for instance, 1000 bar), which is made available at the fuel injector from an external pressure source, for instance via a high-pressure collection chamber (common rail) to a second pressure (for instance 2200 bar), so that two operating pressures are available for the injection event.

The injector body 110 furthermore has a first magnet valve 111, disposed in the control module 132, for controlling the pressure boost in the pressure booster module 138, and a second magnet valve 112, disposed in the nozzle module 140, for controlling the actual injection event via an injection valve member (not shown).

The separation between the control module 132 and the rest of the injector body 110 along the first parting line 124 is of considerable practical significance. This separability or disconnectability has the effect that the ("dry") control module 132 and the ("wet") part of the injector body 110 located below the first parting line 124 can be designed, produced and tested separately, and then put together. Moreover, because of this separability, individual components of the injector body 110 can easily be replaced for maintenance purposes, for instance.

The magnet valve 112 in the nozzle module 140 is electrically triggerable via two electrical valve contacts 114. The injector body 110, on its upper end, has an electrical injector body contact 116 that is accessible from above. In the modular construction of the injector body 110 as shown, the capability of breaking down the injector body 110 and of simple modular assembly is achieved by providing that the valve contacts 114 be connected electrically to the injector body contact 116 in such a way that simple assembly and capability of breaking down the injector body continue to be assured.

In this exemplary embodiment, for connecting the two electrical valve contacts 114 to the injector body contact 116, two conductor conduits 120 are provided, which extend through the modules 138, 136 and 134. The conductor conduits 120 are formed by bores in the pressure booster module 138, in the line connection module 136, and in the sealing plate 134. Once the injector body 110 has been put together, these bores are each aligned at the parting lines 128 and 126, so that the result is a single, continuous conductor conduit 120.

The individual bores of the conductor conduit 120, in this exemplary embodiment, in the various modules 138, 136, 134 each have a rectilinear course. With the provisions of the invention, a curved course of the bores can also be achieved. However, the bores in the individual modules 138, 136, 134 do have a different inclination relative to an injector axis 142. While the conductor conduit 120 in the pressure booster module 138 has an inclination of 1° to the injector axis 142, the inclination in the line connection module 136, in this exemplary embodiment, is 2.2°. These different angles of inclination relative to the injector axis 142 are due to the fact that the injector body 110 tapers in its cross section toward the bottom, that is, from the control module 132 to the nozzle module 140.

The connection between the two electrical valve contacts 114 of the magnet valve 112 and the injector body contact 116 is effected, in this exemplary embodiment, in part via two solid conductors 118. The solid conductors 118 extend through the two conductor conduits 120 and connect the valve contacts 114 to electric plug contacts 122, which in turn are connected to the injector body contact 116 via an electrical connection 144 (for instance, two cables each soldered at one end to an electric plug contact 122 and at another end to the injector body contact 116). The solid conductors 118 are thus fixedly or detachably connected electrically to the valve contacts 114, for instance via a welded connection or a plug-in connection.

The connection of the solid conductors 118 to the plug contacts 122 is done reversibly, so that this connection can be made upon assembly of the injector body 110 by simply pressing the solid conductors 118 into the plug contacts 122. Conversely, in the event of maintenance, the solid conductors 118 can be easily removed from the plug contacts 122 again, and thus the injector body 110 can be broken down again without having to unsolder electrical connections. The solid conductors 118 are selected to be rigid enough that on the one hand they do not substantially change their shape under their own weight, and can thus be easily threaded through the conductor conduits 120 with their different inclinations to the injector axis 142 and plugged into the plug contacts 122. The solid conductors should have a certain plasticity, so that no mechanical stresses arise either at the transition between portions of the conductor conduits 120 that have different angles of inclination. The term "solid conductor" does not necessarily narrow the choice of materials to solid materials; on the contrary, hollow conductors (tubes) may for instance also be used as solid conductors 118, as long as they have sufficient mechanical rigidity.

Particularly on insertion of the solid conductors 118 into the plug contacts 122, or upon putting together the individual modules 132, 134, 136, 138, 140, however, the varying inclination of the conductor conduit 120 in the various modules presents problems. Typically, the individual modules 132, 134, 136, 138, 140 are put together by means of a motion and an exertion of force parallel to the injector axis 142. Thus the inclination of 2.2° of the solid conductors 118 in the line connection module 136, for instance, upon insertion of the solid conductors 118 into the plug contacts 122, which are disposed in portions of the conductor conduits 120 in the control module 132 that extend at an angle of 0° to the injector axis 142, presents difficulties. For optimized insertion of the solid conductors 118 into the plug contacts 122, the solid conductors 118 would have to extend parallel to the injector axis 142. This problem is overcome according to the invention, in this exemplary embodiment, by providing that the two solid conductors 118 are compelled to have a parallel course to the injector axis 142 by means of a respective orientation sleeve 146 (described in further detail below). Instead of two orientation sleeves 146, a single orientation sleeve 146 may also be used, which orients the two solid conductors 118 simultaneously.

The orientation sleeves 146 are thrust partway into the conductor conduits 120 in the line connection module 136, in such a way that the ends of the solid conductors 118 are thrust through the orientation sleeves 146. A parallel course to the injector axis 142 imposed on the ends of the solid conductors 118, which without orientation sleeves 146 would emerge from the conductor conduits 120 at an angle of inclination of 2.2° to the injector axis 142. After the modules 134 and 136 have been put together, the orientation sleeves 146 protrude partway into the conductor conduits 120 (extending parallel to the injector axis 142) in the sealing plate 134.

In the exemplary embodiment shown in FIG. 1, the solid conductors 118 may have a diameter of one millimeter, and as their material they may be formed of or contain CuSn6 with a Brinell hardness of between 80 and 90 HB, a material that is otherwise used as a welding additive, for instance. Alternatively, however, CuAl8, CuAl8Ni2, CuAl8Ni6, CuAl9Fe, CuMn13Al7, CuSi3, CuSn, copper, or nickel silver, for instance, can also be used. These materials meet the aforementioned requirements in terms of hardness and plasticity and moreover are easily joined to the valve contacts 114 by welding. The hardness of the materials should be between 50 and 100 HB, preferably between 60 and 95 HB, and especially advantageously between 75 and 90 HB.

Figure 2:
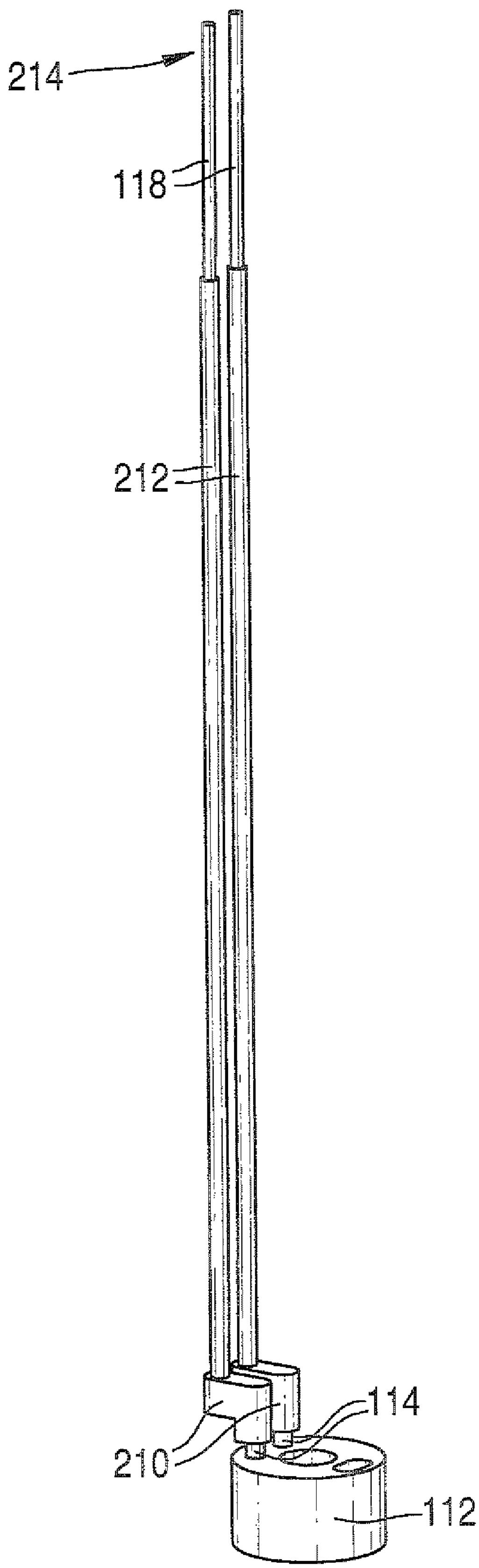
FIG. 2, the magnet valve with its two electrical valve contacts and solid conductors secured to the valve contacts.

In FIG. 2, the magnet valve 112 is shown along with two solid conductors 118, each 127 mm long, which are connected to the valve contacts 114. The connection between the solid conductors 118 and the valve contacts 114 is sheathed in this case with an electrically insulating thermoplastic 210 and is therefore not visible in this perspective view. As the thermoplastic, besides other alternatives, PPS or PA may for instance be used, in particular glass-fiber-filled PPS or PA (such as PPS GF 30 or PA 66 GF 30), and the glass-fiber filling here additionally increases the mechanical stability of the connection. The electrically insulating thermoplastic 210 increases the dimensional stability of the connections between the valve contacts 114 and the solid conductors 118. This additionally assures that the solid conductors 118 will essentially maintain their alignment, which in the assembly of the injector body 110 makes it easier for the solid conductors 118 to be passed through the conductor conduits 120 of the individual modules 138, 136, 134 and then inserted into the plug contacts 122. The thermoplastic 210 also insulates the connecting points from one another, so that short circuits cannot occur between the valve contacts 114. In comparison to conventional flexible wire or cable connections, the assembly of the injector body 110 is thus greatly simplified.

The solid conductors 118 in this exemplary embodiment are also relatively sheathed with shrink-fit hoses 212. The shrink-fit hoses 212 insulate the solid conductors 118 electrically from the walls of the conductor conduits 120 of the injector body 110. To economize on costs, the shrink-fit hoses 212 are not shrunk onto the solid conductors 118 in their entirety, but rather only in some portions. The shrink-fit hoses 212 extend upward from the electrically insulating thermoplastic 210. Alternatively to a shrink-fit hose 212, rigid or elastic electrically insulating plastic sleeves, for instance, can also be used as electric insulators for the solid conductors 118. The electrical insulation, particularly of the shrink-fit hose 212, however, ends in each case below the upper ends 214 of the solid conductors 118, so that the upper ends 214 of the solid conductors 118 are not sheathed in an electrically insulating way and can be plugged in an electrically connecting way into the plug contacts 122. In this way, without a complicated soldering or welding process, by simply putting the segments of the injector body 110 together, an electrically conductive connection between the valve contacts 114 and the injector body contact 116 can be made. On the other hand, the injector body 110 can easily be dismantled again for maintenance purposes, with the plug connection 122 disconnected from the solid conductors 118 again simply by the exertion of force. Unsoldering or disconnecting the connection in some other way is not necessary, since the connection is reversible.

Figure 3:
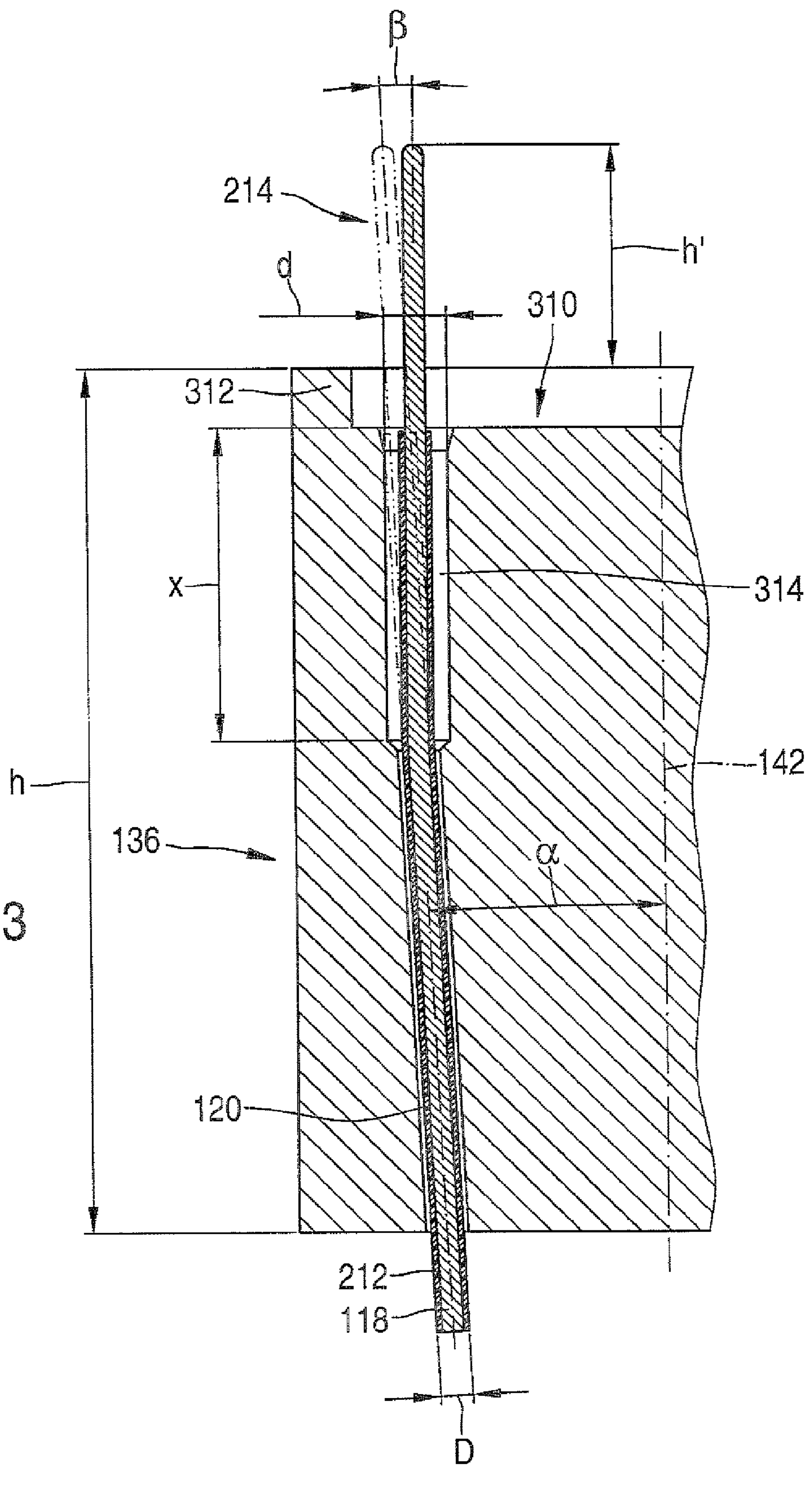
FIG. 3, a sectional view of a detail of a line connection module to illustrate the problem of adapting the angle of inclination of the solid conductor.

In FIG. 3, a sectional view of a detail of the line connection module 136 is shown, in conjunction with which the problems described above of adapting the angles of inclination will be made clear.

The line connection module 136 has a substantially cylindrical conductor conduit 120, with a diameter D of 2 mm. This conductor conduit 120 is inclined by an angle $\alpha$ of 2.2° relative to the injector axis 142. The line connection module 136 has a height h of 40.8 mm, and on its upper end 310, oriented toward the sealing plate 134, it has an annular shoulder 312. The conductor conduit 120, at a length of x=15 mm from the upper end 310 oriented toward the sealing plate 134, is widened at 314 to a diameter d of 3 mm. In the region of this widened portion 314 to a diameter of d=3 mm, the angle of inclination of the conductor conduit 120 also changes relative to the injector axis 142, since in this widened region 314, the conductor conduit 120 extends parallel to the injector axis 142.

A solid conductor 118 extends through the conductor conduit 120. The solid conductor 118 is electrically insulated from the line connection module 136 by means of a shrink-fit hose 212 (see FIG. 2). The upper end 214 of the solid conductor 118, in this exemplary embodiment, protrudes out of the line connection module 136 by a height h'=10.5 mm. Because of the described geometry of the conductor conduit 120, the upper end 214 of the solid conductor 118 may, in the least favorable case, have an angle of inclination $\beta$ to the injector axis 142 of 2.8°. The upper end 214 of the solid conductor 118, which is also rounded for easier insertion into the plug contacts 122, in this geometry has a circle of throwout with a diameter of 3.0 mm. This circle of throwout is too large in its diameter for it to be capable of being reliably received by the plug contacts 122.

In FIGS. 4 and 5, one possible provision is shown by means of which, upon joining the individual modules 136, 134 and 132 together, the problem of angle adaptation of the solid conductors 118 can be overcome. In FIG. 4, the line connection module 136 with solid conductors 118 protruding from the conductor conduits 120 is shown in top view, and in FIG. 5 it is shown in a side view. Before the sealing plate 134 (not shown in FIGS. 4 and 5) and the line connection module 136 are put together, the ends 214 of the solid conductors 118 are plastically deformed by means of a prism 410 and a mechanical stop 412. To that end, the solid conductors 118, near where they emerge from the conductor conduits 120, are first fixed in their position by means of the stop 412, a force being exerted against the solid conductors 118 in the direction of the arrow 414. Next, the upper ends 214 of the solid conductors 118 are inserted into two grooves 416 of the prism 410, and a force is exerted on the ends 214 of the solid conductors 118 in the deformation direction 418 by means of the prism 410. The ends 214 of the solid conductors 118 are plastically deformed, whereupon the angle of inclination relative to the injector axis 142, previously $\gamma$=2.2°, now orients itself to a parallel course to the injector axis 142.

The method shown in FIGS. 4 and 5 has the disadvantage that the solid conductors 118 must be plastically deformable. Moreover, positioning the prism 410 and the stop 412 is complicated in terms of equipment and can often be done only manually. Thus the method shown often proves in practice to be inadequate.

Figure 6:
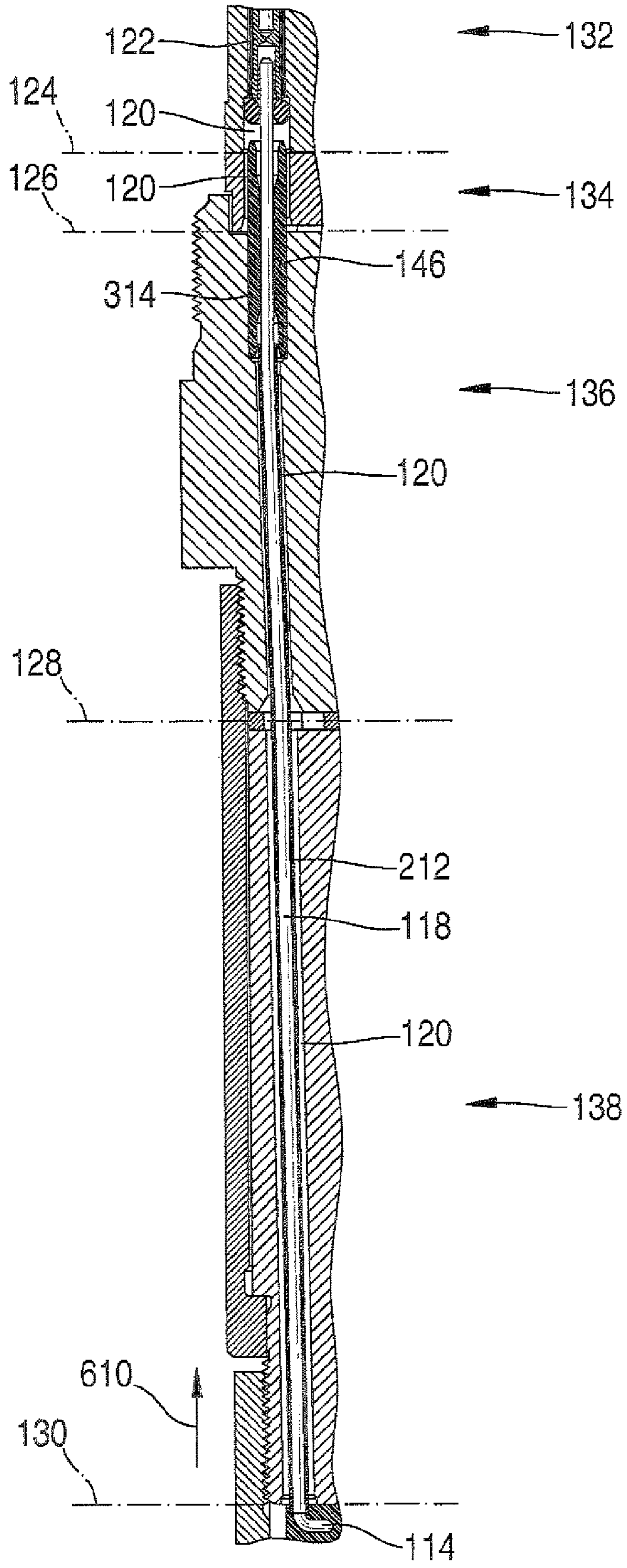
FIG. 6, a sectional view of a detail of an injector body to illustrate the effect of an orientation sleeve.
Figure 7:
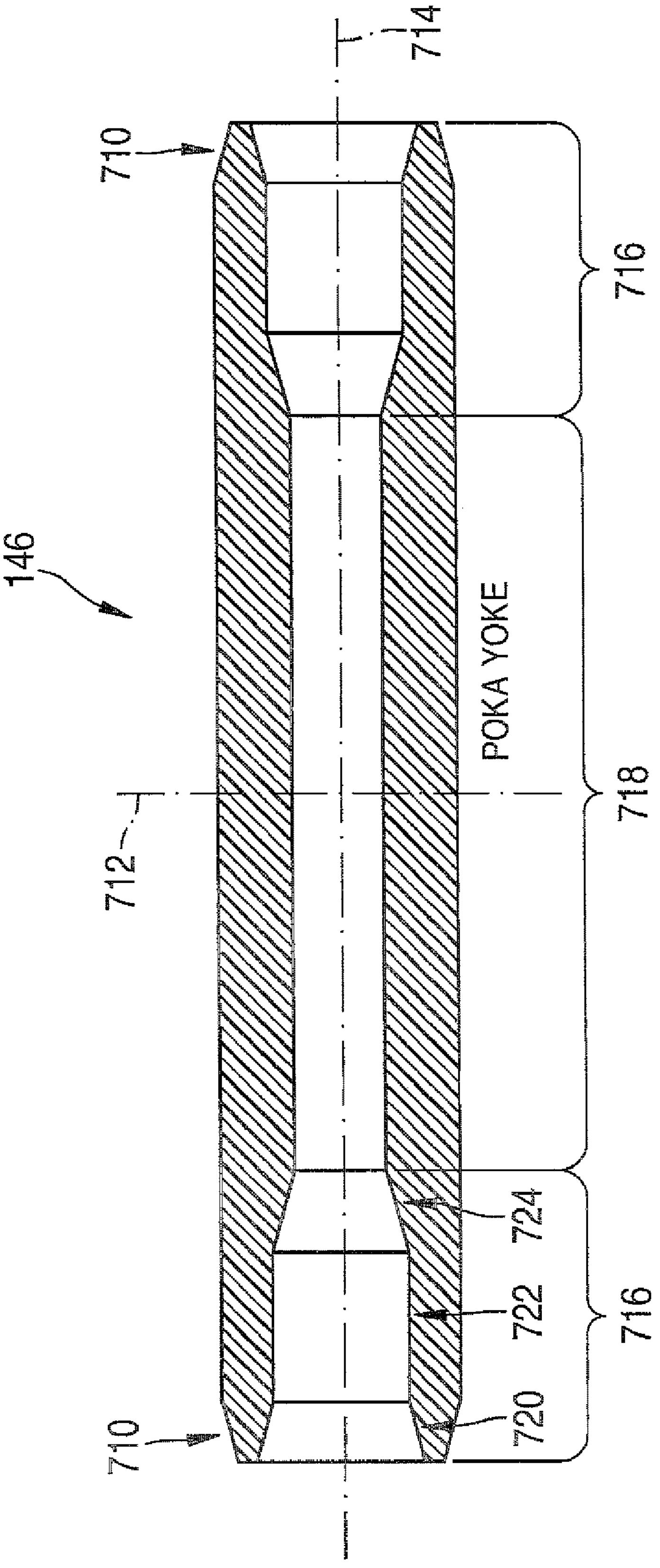
FIG. 7, one exemplary embodiment of an orientation sleeve.
Figure 8:
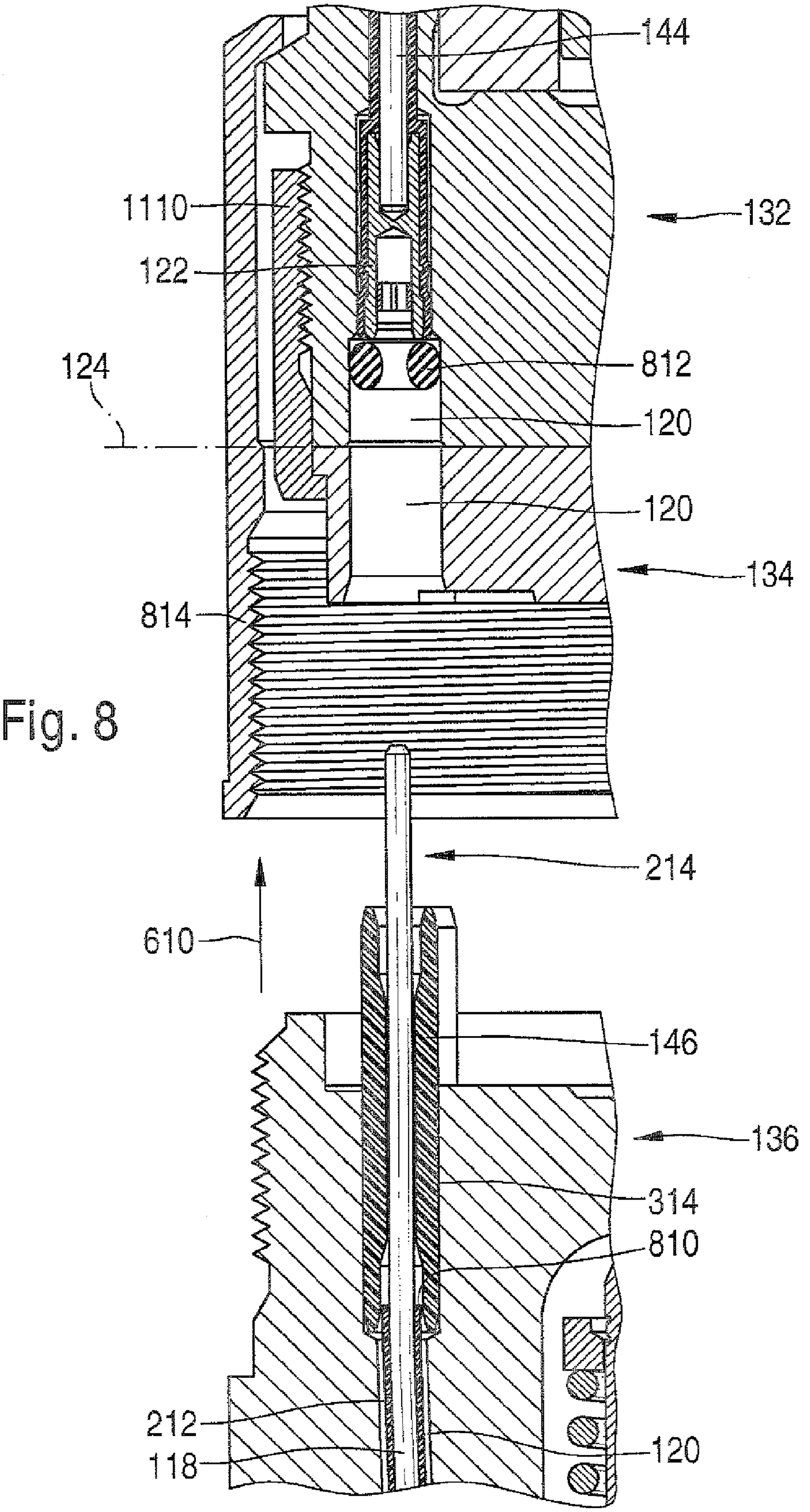
FIG. 8, a sectional view of a detail of an injector body before a solid conductor is inserted into a plug contact.
Figure 9:
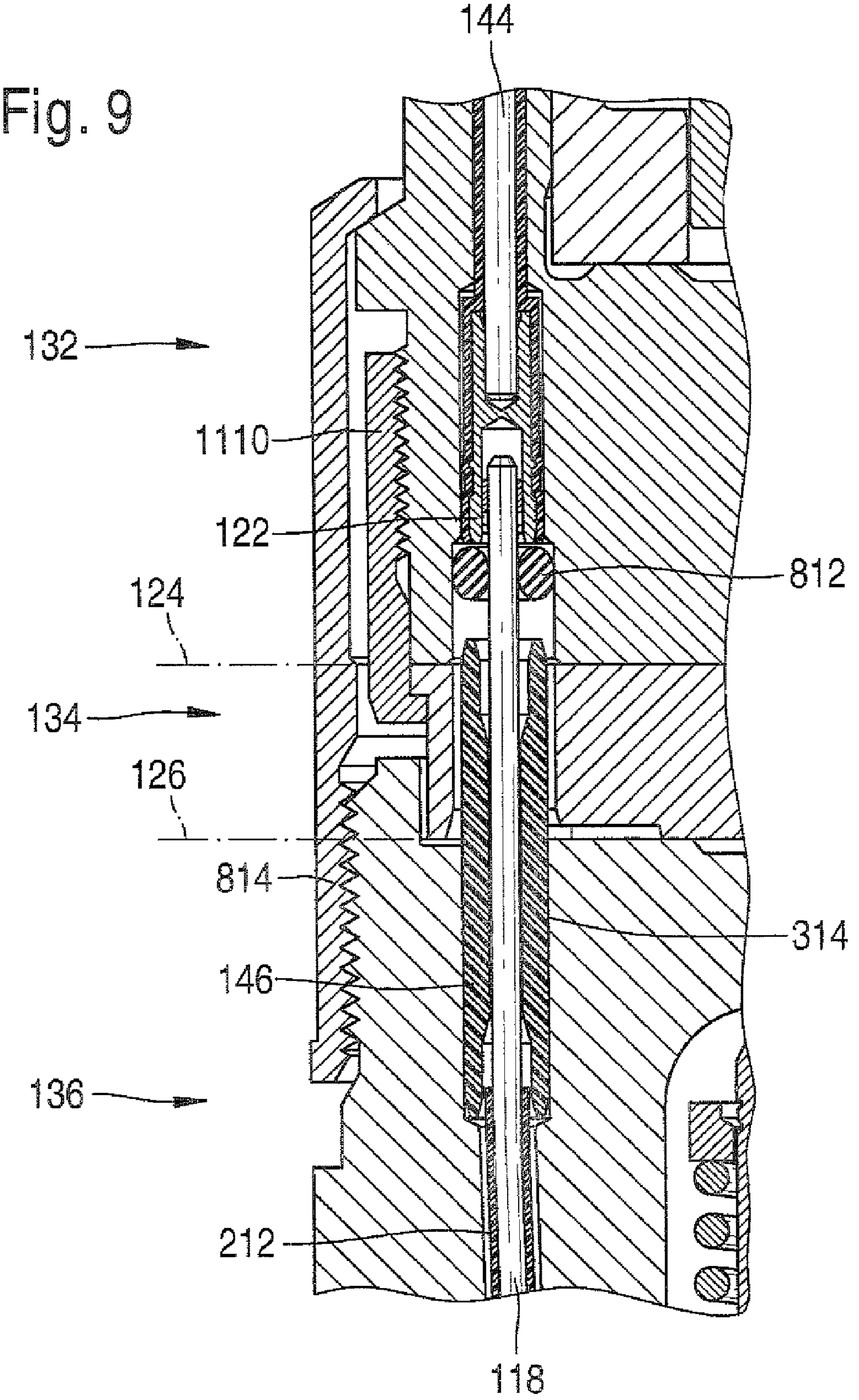
FIG. 9, a sectional view of the detail of FIG. 8 after the insertion of the solid conductor into the plug contact.

In FIGS. 6 through 9, a preferred disposition and a preferred method are therefore shown in which the adaptation of the angles of inclination of the solid conductors 118 is done by means of two orientation sleeves 146. FIG. 6 shows a sectional view of the entire course of the conductor conduit 120, from the valve contacts 114 to the plug contacts 122. In FIG. 7, a sectional view of an orientation sleeve 146 is shown. In FIGS. 8 and 9, the joining together of the line connection module 136, sealing plate 134, and control module 132 by means of the orientation sleeve 146 is shown.

As already explained above in conjunction with FIG. 2, in this exemplary embodiment two solid conductors 118 are joined to the valve contacts 114 of a magnet valve 112 (not shown in FIG. 6). These solid conductors 118 are inserted successively in the insertion direction 610 through the conductor conduits 120 of the pressure booster module 138, the line connection module 136, the sealing plate 134, and the control module 132. The conductor conduits 120 have an angle of inclination of 1.0° to the injector axis 142 in the region of the pressure booster module 138, an angle of inclination of 2.2° in the region of the line connection module 136, and a parallel course to the injector axis 142 in the region of the sealing plate 134 and of the control module 132. The orientation of the solid conductors 118 between the line connection module 136, the sealing plate 134, and the control module 132 is effected in this exemplary embodiment by means of the orientation sleeve 146, which is inserted into the widened region 314 of the conductor conduits 120 on the upper end of the line connection module 136.

In FIG. 7 one exemplary embodiment of an orientation sleeve 146 is shown. The orientation sleeve 146 externally has a cylindrical shape; the ends 710 of the orientation sleeve 146 are chamfered to make it easier to insert the orientation sleeve 146 into the widened regions 314 of the conductor conduits 120. In this exemplary embodiment, the orientation sleeve 146 is made from an electrically insulating plastic, such as (glass-fiber-filled, for instance) PP or PA66 GF35, PA66 GF 30, PPS GF35, or PPS GF30. Alternatively, a ceramic material may for instance be used. The orientation sleeve 146 in this exemplary embodiment is furthermore mirror-symmetrical to a mirror plane 712. This makes the assembly of the fuel injector considerably easier, since the risk of mistaking the two ends of the orientation sleeve 146 for one another, which in an asymmetrical orientation sleeve 146 could lead to incorrect assembly, is eliminated ("Poka Yoke").

A bore that is rotationally symmetrical to a sleeve axis 714 is located in the interior of the orientation sleeve 146. The bore is subdivided into two outer catch regions 716 and one inner orientation region 718. In the area of the orientation region 718, the bore has a cylindrical course that is parallel to the sleeve axis 714. The catch regions 716 initially have a first conical region 720 with an opening angle of 30°, in this exemplary embodiment (that is, an inclination of the wall by 15° to the sleeve axis 714). This is adjoined by a cylindrical region 722 with a larger diameter than the bore of the orientation region 718. In cylindrical region 722, with the solid conductor 118 inserted, the end of the shrink-fit hose 212 can for instance be received, so that the solid conductor 118 is insulated electrically continuously relative to the fuel injector. The cylindrical region 722 is finally adjoined by a second conical region 724, which opens directly into the orientation region 718. In this second conical region 724, the tube wall in this exemplary embodiment again has an opening angle of 30° (that is, again an angle of 15° to the sleeve axis 714). As described above, the orientation sleeve 146 may also be designed as a double orientation sleeve 146; two orientation sleeves, for instance, from the exemplary embodiment shown in FIG. 7 are joined parallel to one another, and the sleeve axes 714 are spaced apart in such a way that they match the spacing of the conductor conduits 120.

In FIGS. 8 and 9, the assembly of the control module 132, sealing plate 134, and line connection module 136 is shown. In FIG. 8, the fuel injector is shown before the joining together is done; the sealing plate 134 has already been placed on the control module 132, but the sealing plate 134 is still separated from the line connection module 136 along the parting line 126. In FIG. 9, all the modules are shown put together. For the assembly, first the solid conductor 118 is thrust through the conductor conduits of the pressure booster module 138 (see FIG. 6) and of the line connection module 136. The shrink-fit hose 212, which electrically insulates the solid conductor 118 from the injector body 110, ends here at the point 810. Next, the orientation sleeve 146 is thrust into the widened region 314 of the conductor conduit 120 of the line connection module 136, so that the upper end 214 of the solid conductor 118 protrudes through the orientation sleeve 146 and is oriented parallel to the injector axis 142. The orientation sleeve 146 protrudes out of the line connection module 136 here.

The upper ends 214 of the solid conductors 118, which are now oriented parallel to the injector axis 142, can be inserted, after this orientation by the orientation sleeve 146, in the insertion direction 610, parallel to the injector axis, through the sealing plate 134 into the plug contacts 122. These plug contacts are in turn electrically conductively connected via the electrical connections 144 to the injector contact 116 on the top end of the fuel injector. When the line connection module 136, sealing plate 134 and control module 132 are put together, the end of the orientation sleeve 146 that protrudes from the line connection module 136 is thrust through the conductor conduit 120 in the sealing plate 134 into the conductor conduit 120 of the control module 132. The upper end 214 of the solid conductor 118 is also inserted into the plug contact 122. Before the assembly one O-ring 812 each is also inserted, upstream of the plug contacts 122, into the conductor conduits 120 of the control module 132. This O-ring 812 prevents fuel, particularly diesel oil, from being able to penetrate into the control module 132. Thus the "wet region" of the modules 134, 136, 138 and 140 is partitioned off from the "dry" control module 132 by the O-rings 812. After the modules 132, 134 and 136 are joined together, these modules are screwed together by means of a union nut 1110. For maintenance purposes, this screw connection and the electrical plug-in connection of the solid conductor 118 and the plug contact 122 can easily be undone again, so that individual modules can for instance be replaced or checked in a simple way and without requiring unsoldering.

Figure 10:
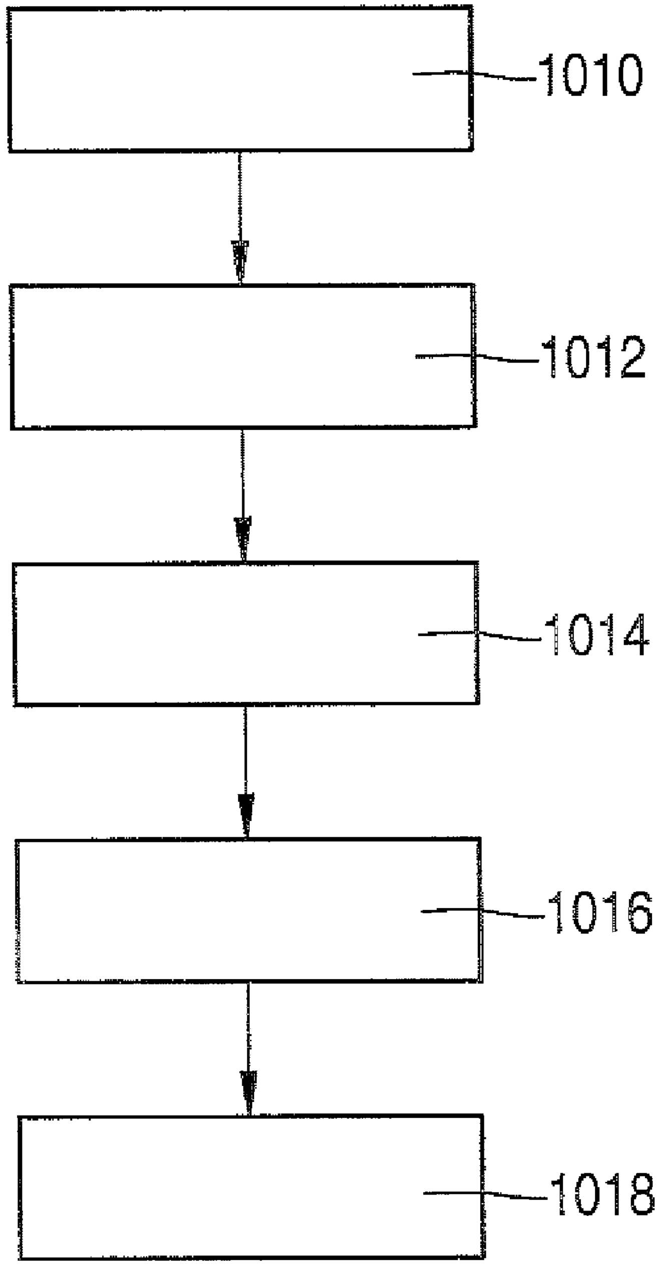
FIG. 10, a flow chart of a method according to the invention for producing a fuel injector.

In FIG. 10, a flow chart of a method of the invention for producing a fuel injector of the invention is shown. However, the method is not limited to the steps shown, and additional method steps, not shown in FIG. 10, may also be performed. The method can also be performed in a different order from that shown. The method can be made clear for instance on the basis of the arrangements shown in FIGS. 8 and 9.

First, in a first method step 1010, a first module, such as the control module 132, of the fuel injector is produced. The first module 132 should have at least one injector body contact 116. Next, in method step 1012, a second module is produced, which may for instance be the nozzle module 140. This second module 140 should have at least one electrically triggerable valve 112 with at least one electrical valve contact 114. Next, in method step 1014, the at least one electrical valve contact 114 is joined to at least one electrical solid conductor 118 that is essentially dimensionally stable under its own weight. Then in method step 1016, by means of at least one orientation sleeve 146, a predetermined inclination to the injector axis 142 is imposed on the at least one solid conductor 118, entirely or in part. Next, the two modules 132, 140 are joined directly or indirectly (see for example FIGS. 8 and 9) to an injector body 110; the at least one solid conductor 118 is reversibly joined directly or indirectly (that is, for instance via an electrical connection 144) to the at least one injector body contact 116 in method step 1018.

The described arrangement in one of its embodiments and the described method of the invention for producing the fuel injectors represent a considerable improvement over conventional methods and arrangements, in which electrical cables are used for connection between the valve contacts 114 and the injector body contacts 116. Complicated soldering processes and tedious passing of cables through the individual modules of the injector body 110 are thus dispensed with. The processes of assembling the fuel injectors and corresponding maintenance of the fuel injectors are thus greatly simplified.

Figure 11:
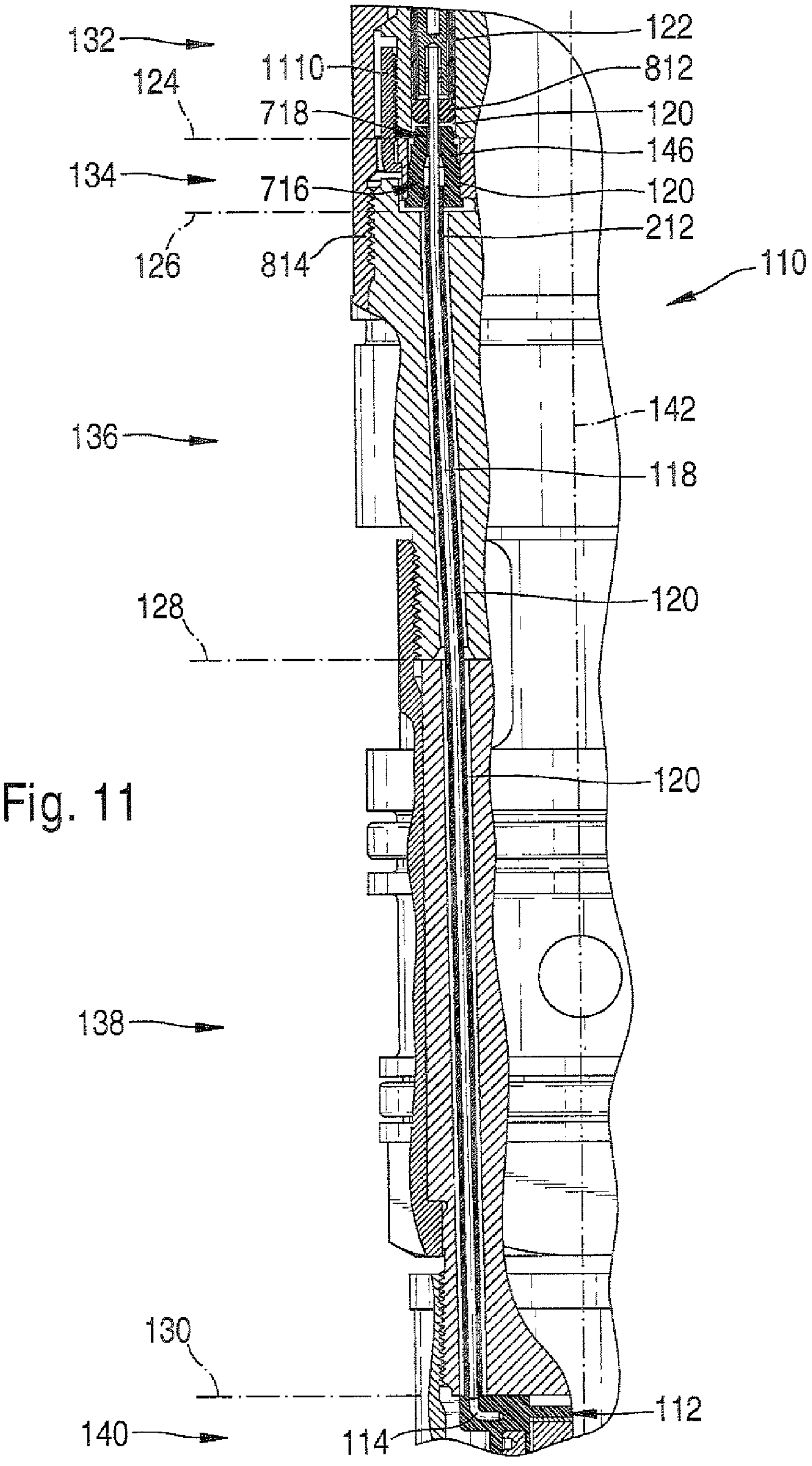
FIG. 11, a sectional view of a second exemplary embodiment of an injector body with a double orientation sleeve.
Figure 12:
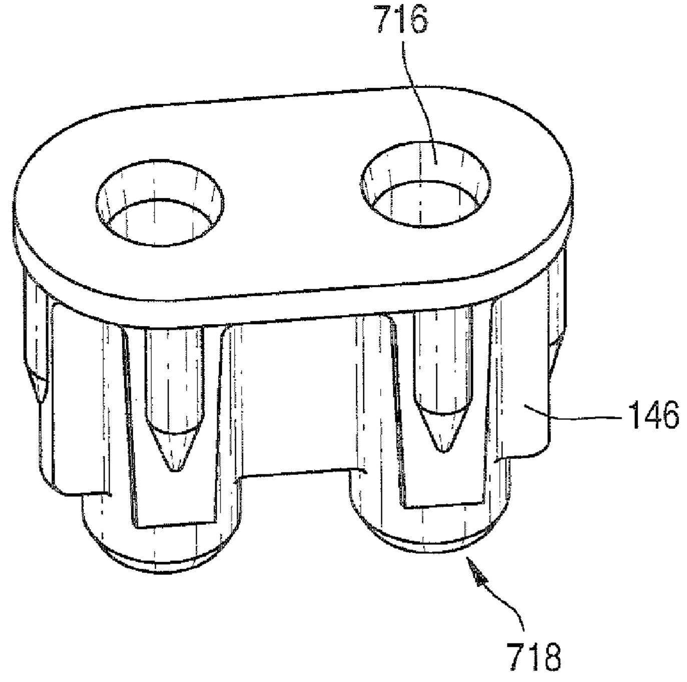
FIG. 12, a perspective view of the double orientation sleeve show in the exemplary embodiment of FIG. 11.
Figure 13:
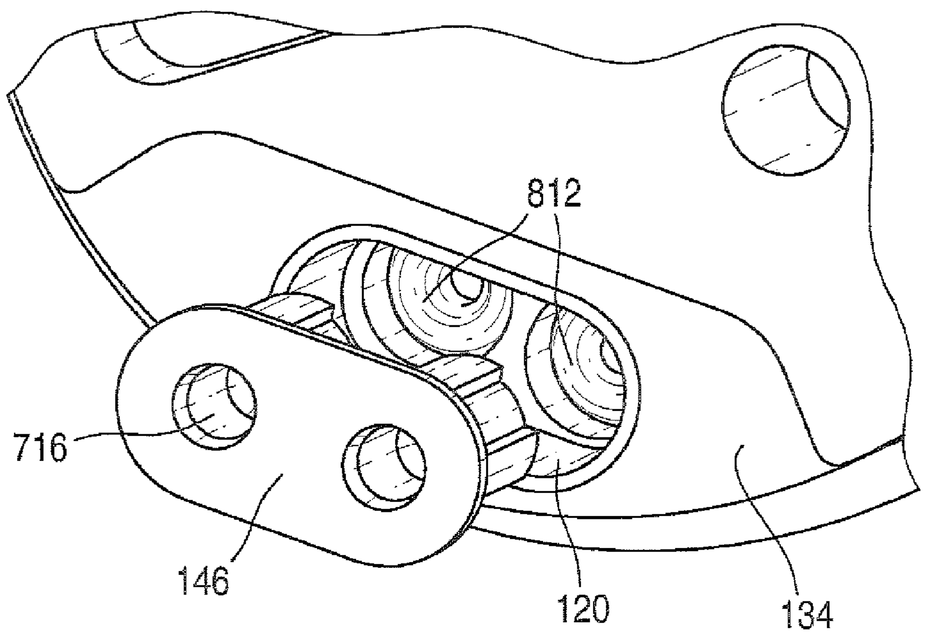
FIG. 13, a perspective view of the insertion operation of the double orientation sleeve, shown in FIG. 12, into a conductor conduit, embodied as an oblong slot, in the sealing plate of the exemplary embodiment of FIG. 11.

In FIGS. 11 through 13, a second exemplary embodiment of a fuel injector of the invention is shown in a fragmentary sectional view. Once again, the fuel injector has an injector body 110, which is constructed in modular fashion and can be dismantled along the parting lines 124, 126, 128 and 130 into a control module 132, a sealing plate 134, a line connection module 136, a pressure booster module 138, and a nozzle module 140. Again, as already in the exemplary embodiment of FIG. 1, the fuel injector has a magnet valve 112, which is disposed in the nozzle module 140 and can be electrically contacted via two valve contacts 114 (located one after the other in FIG. 11). These valve contacts 114 are joined to electrical plug contacts 122 via solid conductors 118, which again extend through corresponding conductor conduits 120. In this exemplary embodiment of FIG. 11, in contrast to the exemplary embodiment of FIG. 1, instead of a single orientation sleeve 146, a double orientation sleeve 146 is used. This double orientation sleeve 146, which is shown in perspective in FIG. 12, is capable of orienting the two solid conductors 118 simultaneously. In terms of its construction, the double orientation sleeve 146 show in FIGS. 11 and 12 is designed similarly to the exemplary embodiment of FIG. 7, but only half of the orientation sleeve 146 of FIG. 7 is used (for instance, the half to the left of the mirror plane 712). Instead, two of these “half” orientation sleeves 146 are joined together parallel, so that the two solid conductors 118 are oriented simultaneously. Once again, the orientation sleeve 146 substantially has two regions, that is, a catch region 716 and an orientation region 718. Again, as already in the exemplary embodiment of FIG. 7, the catch region 716 serves to increase the “interception tolerance”, or in other words the tolerance of the angle at which the orientation sleeve 146 is capable of receiving a solid conductor 118 that enters the orientation sleeve at an angle to the injector axis 142. For this purpose, the catch region 716 once again has a larger diameter than the solid conductor 118. Moreover, the diameter in the catch region 716 is so great that the shrink-fit hose 212 of the solid conductors 118 can also be received with them in this catch region 716. The shrink-fit hose 212 ends in this catch region 716 of the orientation sleeve 146. Thus a continuous insulation of the solid conductor 118 relative to the injector body 110 is assured. The orientation region 718 includes a substantially cylindrical region, in which a direction parallel to the injector axis 142 is forced upon the solid conductor 118.

Unlike the exemplary embodiment of FIG. 1, however, in the exemplary embodiment of FIG. 11 the orientation sleeve 146 is inserted not into the line connection module 136, but into a conductor conduit 120 in the sealing plate 134. In this case, as shown in FIG. 13, this conductor conduit 120 is designed as a common conductor conduit 120 for both solid conductors, or in other words in the form of an oblong slot 120. In the remainder of the injector body 110, the two conductor conduits 120 of the two solid conductors 118 are embodied as separate bores, however. In this exemplary embodiment, the conductor conduits 120 have an inclination of 1° relative to the injector axis 142 in the region of the pressure booster module 138, an inclination of 1.795° each to the injector axis in the region of the line connection module 136, and finally an inclination of 0° in the sealing plate 134.

For the assembly of the fuel injector in FIG. 11, the solid conductors 118 are first joined to the valve contacts 114. Next, the line connection module 136 and the pressure booster module 138 are joined to one another (for instance by a union nut). Then the line connection module 136 and the pressure booster module 138 are placed together on the nozzle module 140, whereupon the solid conductors 118 are thrust through the conductor conduits 120 of the pressure booster module 138 and of the line connection module 136. Next, the pressure booster module 138 is joined to the nozzle module 140, for instance once again by a union nut.

Regardless of this, the control module 132 is prepared for a connection to the line connection module 136. To that end, the O-rings 812, as can be seen particularly in FIG. 13 and FIG. 11, are thrust into the conductor conduits 120 of the control module 132, so that these O-rings 812 come to rest directly upstream of the plug contacts 122 and seal them off against the penetration of fuel. Next, the sealing plate 134 is placed on the control module 132 and joined to it via a union nut 1110. Next, the double orientation sleeve 146, as shown in FIG. 13, is inserted into the conductor conduit 120 (oblong slot) of the sealing plate 134. The double orientation sleeve 146 preferably ends flush with the surface, oriented toward the second parting line 126, of the sealing plate 134 or may protrude slightly past it. A slight countersinking of the double orientation sleeve 146 into the sealing plate 134 is also conceivable.

Next, the control module 132 with the sealing plate 134 placed on it and the inserted orientation sleeve 146 is mounted on the line connection module 136. In this operation, as described above, the solid conductors 118 that emerge from the line connection module 136 at an angle of 1.795° each (still other angular positions are understood to be possible) are engaged by the catch regions 716 of the double orientation sleeves 146 and oriented by the orientation regions 718 of the double orientation sleeve 146 to an angle of 0° to the injector axis 142, so that the solid conductors 118 can pass through the O-rings 812 to enter the plug contacts 122, where they can enter into an electrical connection, for instance by nonpositive engagement, with the plug contacts 122, thereby creating an electrical connection between the valve contacts 114 and the injector body contact 116. The placement of the unit comprising the control module 132 and the pressure booster 134 on the unit comprising the line connection module 136, the pressure booster module 138, and the nozzle module 140 is done by blind joining, since because of the use of the double orientation sleeve 146, adjustment of the solid conductors 118 is no longer required.

The foregoing relates to a preferred exemplary embodiment of the invention, it being understood that other variants and embodiments thereof are possible within the spirit and scope of the invention, the latter being defined by the appended claims.

The invention claimed is:

1. A fuel injector for injecting fuel into a combustion chamber of an internal combustion engine, the fuel injector comprising, an injector body having an injector axis;

at least one electrically triggerable valve, let into the injector body, the at least one electrically triggerable valve having at least one electrical valve contact, at least one electrical injector body contact accessible from an outside of the injector body, at least one conductor conduit, at least one solid electrical conductor at least in part connecting the at least one electrical valve contact and the at least one electrical injector body contact, the at least one solid electrical conductor being substantially dimensionally stable under its own weight and extending through the at least one conductor conduit;

the at least one conductor conduit, in at least one first region or module of the injector body, having an inclination to the injector axis that differs from at least one second region or module of the injector body, and at least one orientation sleeve engaging and imposing, a predetermined inclination to the injector axis entirely or in part on the at least one solid electrical conductor in at least one region or module to thereby orient the solid conductor, wherein the at least one orientation sleeve is disposed in the at least one conductor conduit in a first module, and the at least one orientation sleeve imposes essentially an inclination of the at least one solid electrical conductor in a conductor conduit in a second module, different from the first module, and thus aligns the at least one solid electrical conductor.

2. The fuel injector as defined by claim 1, wherein the at least one orientation sleeve imposes a substantially parallel course to the injector axis on the at least one solid electrical conductor.

3. The fuel injector as defined by claim 1, wherein the at least one orientation sleeve comprises at least one catch region and at least one orientation region.

4. The fuel injector as defined by claim 2, wherein the at least one orientation sleeve comprises at least one catch region and at least one orientation region.

5. The fuel injector as defined by claim 3, wherein the at least one catch region comprises at least one tubular region, extending conically to a sleeve axis at an angle other than zero.

6. The fuel injector as defined by claim 3, wherein the at least one orientation region comprises at least one cylindrically extending tubular region.

7. The fuel injector as defined by claim 1, wherein the at least one orientation sleeve is designed as a double orientation sleeve for simultaneous orientation of two solid electrical conductors.

8. A fuel injector for injecting fuel into a combustion chamber of an internal combustion engine, the fuel injector comprising, an injector body having an injector axis;

at least one electrically triggerable valve, let into the injector body, the least one electrically triggerable valve having at least one electrical valve contact, at least one electrical injector body contact accessible from an outside of the injector body, at least one conductor conduit, at least one solid electrical conductor at least in part connecting the at least one electrical valve contact and the at least one electrical injector body contact, the at least one solid electrical conductor being substantially dimensionally stable under its own weight and extending through the at least one conductor conduit;

the at least one conductor conduit, in at least one first region or module of the injector body, having an inclination to the injector axis that differs from at least one second region or module of the injector body, and at least one orientation sleeve engaging and imposing, a predetermined inclination to the injector axis entirely or in part on the at least one solid electrical conductor in at least one region or module to thereby orient the solid conductor, wherein the at least one orientation sleeve comprises at least one catch region and at least one orientation region, and the at least one catch region comprises at least one tubular region, extending conically to a sleeve axis at an angle other than zero.

9. A fuel injector for injecting fuel into a combustion chamber of an internal combustion engine, the fuel injector comprising, an injector body having an injector axis;

at least one electrically triggerable valve, let into the injector body, the least one electrically triggerable valve having at least one electrical valve contact, at least one electrical injector body contact accessible from an outside of the injector body, at least one conductor conduit, at least one solid electrical conductor at least in part connecting the at least one electrical valve contact and the at least one electrical injector body contact, the at least one solid electrical conductor being substantially dimensionally stable under its own weight and extending through the at least one conductor conduit;

the at least one conductor conduit, in at least one first region or module of the injector body, having an inclination to the injector axis that differs from at least one second region or module of the injector body, and at least one orientation sleeve engaging and imposing, a predetermined inclination to the injector axis entirely or in part on the at least one solid electrical conductor in at least one region or module to thereby orient the solid conductor, wherein the at least one orientation sleeve is designed as a double orientation sleeve for simultaneous orientation of two solid electrical conductors.

* * * * *